United States Patent Office 2,830,079
Patented Apr. 8, 1958

2,830,079

MIXED SALTS OF 3,4,5,6-TETRAIODOPHTHALIC ACID OPAQUE TO X-RADIATION

William F. Bruce, Havertown, and Julius Diamond, Philadelphia, Pa., assignors to American Home Products Corporation, New York, N. Y., a corporation of Delaware No Drawing. Application February 2, 1953
Serial No. 334,737

6 Claims. (Cl. 260—501)

This invention relates to certain new chemical compounds which are opaque to radiation, particularly to X-rays. They are valuable for use in rendering portions of the body of animals or human beings opaque to X-radiation, and are thus useful in veterinary and human therapy.

Our invention is also directed to the novel process by which these compounds may be readily prepared.

Our new chemical compounds are the mixed alkali metal-alkanolamine salts of 3,4,5,6-tetraiodophthalic acid and mixed ammonium-alkanolamine salts of 3,4,5,6-tetraiodophthalic acid. These salts are water-soluble and give aqueous solutions of almost neutral reaction, and may be used for the purpose of rendering parts of the human body opaque to X-radiation. They may, for example, be used in solutions of suitable viscosity and instilled into the lungs of a human being or animal. Because of their solubility, they have the advantage of relatively rapid elimination.

On admixture with 0.9% of sodium chloride (i. e. the physiological saline concentration), or with greater amounts of sodium chloride, the new compounds give a precipitate of the less soluble sodium salt. Although we do not wish to be bound by any theory of operation, it seems probable that at the site of use in the human body, or in an animal, as the compounds contact saline body fluids a similar precipitation may occur in the tissues. In this way it is possible to have available as opaquing media for X-radiation longer-acting preparations, intermediate in their period of action between the permanently soluble compounds, which are rapidly eliminated, and oil-soluble compounds which are eliminated only very slowly. This mode of operation with reference to the formation of insoluble sodium salts is unusual, and was not to be expected from the surprising solubility conferred on the compounds by the alkanolamines.

While alkali metal and alkaline earth metal salts of tetraiodophthalic acid are now known, both the mono-alkali metal and mono-alkaline earth metal salts of 3,4,5,6-tetraiodophthalic acid are insoluble in water. The di-alkali metal salts of 3,4,5,6-tetraiodophthalic acid are also insoluble at ordinary pH values, although at a high pH, such as a pH of 9 or higher, they can be brought slightly into solution yielding, however, solutions which are too alkaline to be useful.

The new chemical compounds may be represented by the following general formula:

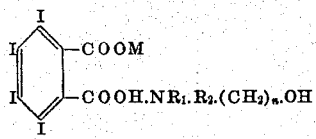

where M represents an alkali metal or ammonium; $R_1$ and $R_2$ represent hydrogen, lower alkyl, or $(CH_2)_nOH$; and $n$ is an integer selected from the group which consists of 2, 3 and 4.

The new chemical compounds may be readily prepared by dissolving a mono-alkali metal tetraiodophthalate monohydrate or ammonium tetraiodophthalate monohydrate in a slight excess of concentrated aqueous alkanol amine, such as monoethanolamine, diethanolamine, N - alkyl monoethanolamine, N - alkyl diethanolamine, N,N-dialkyl monoethanolamine, triethanolamine, monopropanolamine, etc. After filtering, the filtrate may be diluted with a large volume of a precipitating agent such as acetone. The precipitated salt may then be filtered off, washed with methanol, and dried.

Alternatively, the aqueous solution of the reaction product in a slight excess of the alkanolamine may be evaporated to dryness, either at atmospheric pressure or at a reduced pressure less than atmospheric, and the dry product recovered from the bottom of the vessel.

When starting with monopotassium tetraiodophthalate monohydrate and monoethanolamine, for example, there is thus obtained the mixed salt, i. e. potassium monoethanolamine 3,4,5,6-tetraiodophthalate, which decomposes without melting at 350° C. The pH of its aqueous solution is 6.5, and it has the empiric formula $$C_{10}H_8O_5NI_4K$$

Other salts of this type falling within the above generic structural formula are readily prepared in a similar manner, starting with any other alkali metal (or ammonium) salt of tetraiodophthalic acid and any of the previously specified alkanolamines.

The starting material, monopotassium 3,4,5,6-tetraiodophthalate monohydrate, or other mono-alkali metal tetraiodophthalate monohydrate, may be readily prepared by digesting 3,4,5,6-tetraiodophthalic anhydride with potassium hydroxide or other caustic alkali for 30 minutes at 100° C. Preferably an aqueous solution of the caustic alkali of about 20% concentration is employed. Cooling, followed by dilution with water and acidification by the addition of a mineral acid, such as hydrochloric acid, results in the precipitation of the yellow mono-alkali metal salt of 3,4,5,6-tetraiodophthalic acid.

By a similar procedure, starting with the sodium, lithium or ammonium salt of tetraiodophthalic acid, and utilizing the appropriate alkanolamine, i. e. diethanolamine; triethanolamine; N - methylmonoethanolamine; N,N-dimethylmonoethanolamine; N-methyldiethanolamine; or n-monopropanolamine; the following compounds are readily prepared:

Sodium-diethanolamine salt of 3,4,5,6-tetraiodophthalic acid

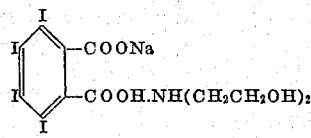

Lithium-triethanolamine salt of 3,4,5,6-tetraiodophthalic acid

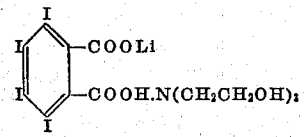

Sodium-N-methylmonoethanolamine salt of 3,4,5,6-tetraiodophthalic acid

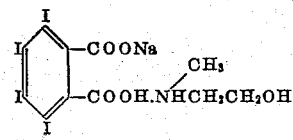

Sodium-N,N-dimethylmonoethanolamine salt of 3,4,5,6-tetraiodophthalic acid

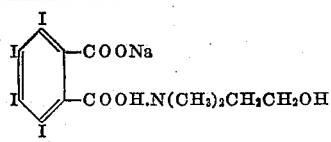

Ammonium-N-methyldiethanolamine salt of 3,4,5,6-tetraiodophthalic acid

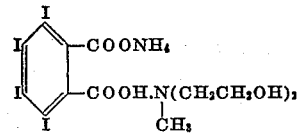

Sodium-n-monopropanolamine salt of 3,4,5,6-tetraiodophthalic acid

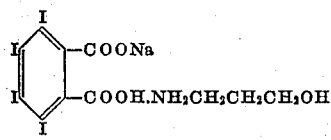

Various changes and modifications may be made in our invention as described. To the extent that these changes and modifications are within the scope of the appended claims, they are to be regarded as part of our invention.

We claim:

1. A compound of the formula:

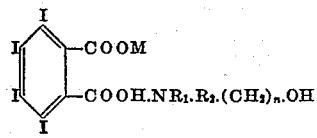

where M is selected from the group which consists of the alkali metals and ammonium; $R_1$ and $R_2$ are selected from the group which consists of hydrogen, lower alkyl, and $(CH_2)_nOH$; and $n$ is selected from the group which consists of 2, 3 and 4.

2. A compound of the formula:

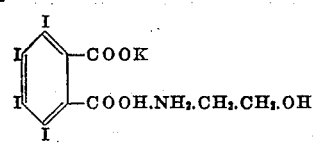

3. A compound of the formula:

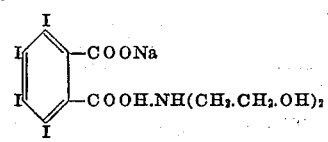

4. A compound of the formula:

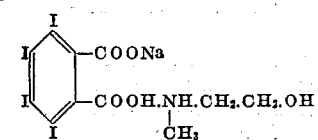

5. A compound of the formula:

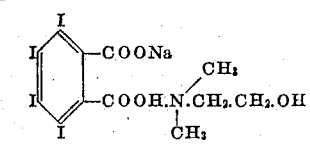

6. A compound of the formula:

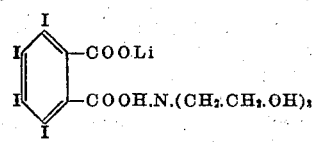

References Cited in the file of this patent

UNITED STATES PATENTS 2,247,880     Guerbet  ---------------- July 1, 1941